United States Patent
Bezner

(10) Patent No.: US 9,764,781 B2
(45) Date of Patent: Sep. 19, 2017

(54) SELF-STOWING RECTANGULAR PONTOON TRAILER SKIRTS

(71) Applicant: Bruce Bezner, Lindsay, TX (US)

(72) Inventor: Bruce Bezner, Lindsay, TX (US)

(73) Assignee: PACCAR Inc, Bellevue, WA (US)

( * ) Notice: Subject to any disclaimer, the term of this patent is extended or adjusted under 35 U.S.C. 154(b) by 0 days.

(21) Appl. No.: 15/014,970

(22) Filed: Feb. 3, 2016

(65) Prior Publication Data

US 2017/0217506 A1  Aug. 3, 2017

(51) Int. Cl.
*B62D 35/02* (2006.01)
*B62D 35/00* (2006.01)

(52) U.S. Cl.
CPC ............ *B62D 35/001* (2013.01); *B62D 35/02* (2013.01)

(58) Field of Classification Search
CPC ............................... B62D 35/001; B62D 35/02
USPC ..... 296/180.5, 180.4, 198; 293/34, 118, 128
See application file for complete search history.

(56) References Cited

U.S. PATENT DOCUMENTS

| | | | |
|---|---|---|---|
| 2,618,493 A | 11/1952 | Fransen, Sr. et al. | |
| 4,611,847 A | 9/1986 | Sullivan | |
| 4,688,824 A * | 8/1987 | Herring | B60R 21/34 280/762 |
| 4,877,266 A * | 10/1989 | Lamparter | B60R 19/565 280/762 |
| 5,280,990 A * | 1/1994 | Rinard | B62D 35/001 296/180.1 |
| 5,609,384 A * | 3/1997 | Loewen | B62D 33/027 296/180.1 |
| 5,921,617 A | 7/1999 | Loewen et al. | |
| 6,079,769 A * | 6/2000 | Fannin | B62D 35/001 296/180.1 |
| 6,644,720 B2 * | 11/2003 | Long | B62D 25/168 296/180.4 |
| 7,188,875 B2 * | 3/2007 | Norelius | B60R 19/565 293/118 |
| 7,887,120 B2 | 2/2011 | Boivin et al. | |
| 8,201,870 B2 * | 6/2012 | Hall | B62D 25/12 296/180.1 |

(Continued)

FOREIGN PATENT DOCUMENTS

GB  1 528 108  10/1978

OTHER PUBLICATIONS

"TrailerBlade™ Model 715: Advanced Aerodynamic Trailer Skirt," Strehl LLC, Phoenix, Ariz., <www.strehlusa.com> [retrieved Aug. 29, 2014], 4-page brochure.

(Continued)

*Primary Examiner* — Jason S Morrow
*Assistant Examiner* — E Turner Hicks
(74) *Attorney, Agent, or Firm* — Christensen O'Connor Johnson; Matthew Balint; Brandon Stallman

(57) ABSTRACT

A stowable side fairing for a tractor-trailer having a frame includes first and second panels rotatably coupled to the frame and extending downward from the frame. A cross-member is rotatably coupled at a first end to the first panel and at a second end to the second panel. The side fairing further includes a drive arm rotatably coupled at a first end to the frame and at a second end to the cross-member. An actuator is configured to rotate the drive arm about the first end to move the side fairing between a deployed position and a stowed position.

13 Claims, 8 Drawing Sheets

(56) References Cited

U.S. PATENT DOCUMENTS

| | | | |
|---|---|---|---|
| 8,303,025 B2 * | 11/2012 | Senatro | B62D 35/001 |
| | | | 180/903 |
| 8,398,150 B2 * | 3/2013 | Brown | B62D 25/168 |
| | | | 280/851 |
| 8,678,474 B1 | 3/2014 | Boivin et al. | |
| 8,783,758 B2 | 7/2014 | Baker | |
| 2010/0201153 A1 | 8/2010 | Pesotini, Jr. | |

OTHER PUBLICATIONS

"Transfoil™.com Aerodynamic Skirts: Our Skirts Are Different," TransFoil Aerodynamic Truck Trailer Skirts, Thomasville, Ga., <http://www.transfoil.com/our-skirts-are-different?tmpl=component&print=1&page=> [retrieved Aug. 18, 2014], 3-page brochure.

* cited by examiner

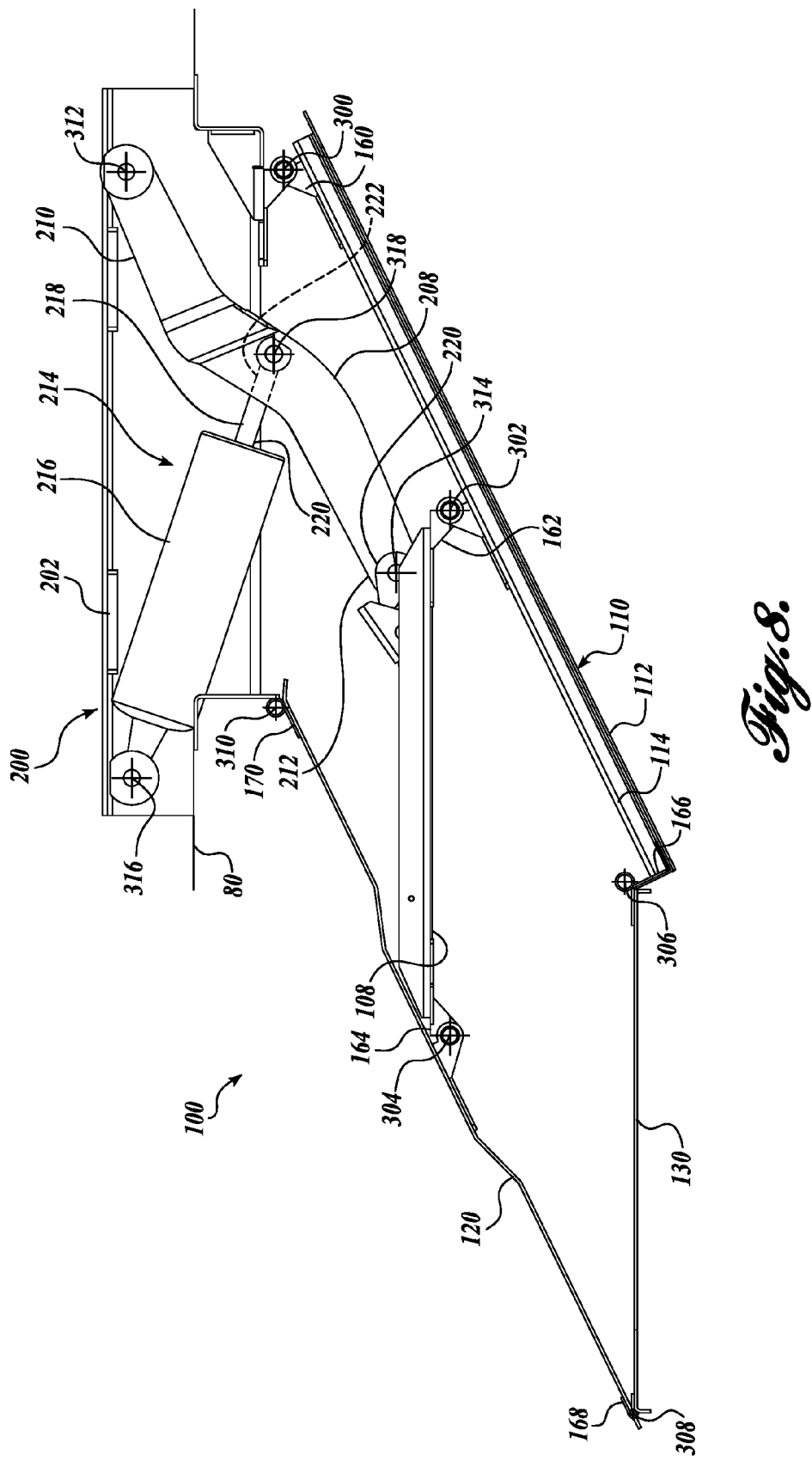

SELF-STOWING RECTANGULAR PONTOON TRAILER SKIRTS

BACKGROUND

Numerous means have been sought to improve the fuel-efficiency of moving bodies and, especially, moving bluff bodies by reducing their aerodynamic drag. In the field of surface transportation, and particularly in the long-haul trucking industry, even small improvements in fuel efficiency can reduce annual operating costs significantly. It is therefore advantageous in the design of a vehicle to reduce drag forces, thereby increasing the aerodynamic properties and efficiency of the vehicle.

The over-the-highway cargo-hauling tractor-trailer combination is one vehicle that experiences excessive aerodynamic drag. Generally described, tractor-trailer combinations typically include a tractor having a so-called fifth wheel by which a box-like semi-trailer may be attached to the tractor. The shape of the conventional cargo trailer is essentially a rectangular box. The fore and aft vertical surfaces of such trailers are also generally flat rectangular surfaces.

Most large long-haul cargo trailers similar to those described above exhibit less than optimal aerodynamic performance during highway operation. At highway speeds, these conventional trailers develop a substantial amount of turbulent airflow in the region between the axles of the wheel assembles below the trailer box. This turbulence results in significant aerodynamic drag, increasing both fuel consumption and Nitrogen Oxide (NOx) emissions of the tractor.

Existing trailers utilize side skirts to reduce aerodynamic drag and to provide some under-run protection from a side impact. These trailer skirts are generally flat, homogeneous rubber or a plastic material that are fixedly secured to the trailer and are designed to fold or collapse on impact.

SUMMARY

A first representative embodiment of a disclosed stowable side fairing is suitable for use on a tractor-trailer having a frame. The stowable side fairing includes first and second panels rotatably coupled to the frame and extending downward from the frame. A cross-member is rotatably coupled at a first end to the first panel and at a second end to the second panel. The side fairing further includes a drive arm rotatably coupled at a first end to the frame and at a second end to the cross-member. An actuator is configured to rotate the drive arm about the first end to move the side fairing between a deployed position and a stowed position.

A second representative embodiment of a disclosed stowable side fairing is suitable for use on a tractor-trailer having a frame. The stowable side fairing has a first panel rotatably coupled to the frame about a first axis and extending downward from the frame. A second panel is also rotatably coupled to the frame and extends downward from the frame. A closeout panel is rotatably coupled at one edge to the first panel and rotatably coupled at a second edge to the second panel, such that the frame, the first panel, the second panel, and the closeout panel form a quadrilateral. The stowable side fairing also includes an actuator configured to rotate the first panel about the first axis to reciprocate the side fairing between a stowed position and a deployed position.

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

DESCRIPTION OF THE DRAWINGS

The foregoing aspects and many of the attendant advantages of this disclosed subject matter will become more readily appreciated as the same become better understood by reference to the following detailed description, when taken in conjunction with the accompanying drawings, wherein:

FIG. 8 shows the second cross-sectional view of the trailer skirt of FIG. 7, with the trailer skirt in the stowed position.

DETAILED DESCRIPTION

Figure 1:
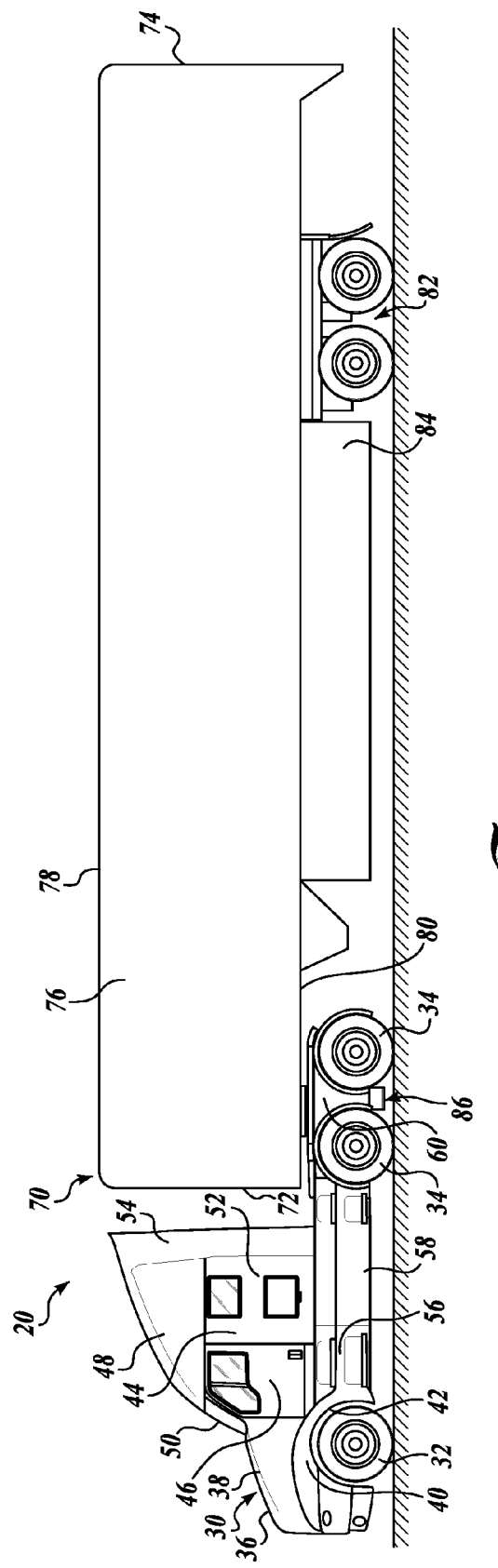
FIG. 1 shows a side view of a cargo-type trailer having a conventional trailer skirt.

The detailed description set forth below in connection with the appended drawings where like numerals reference like elements is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

The following discussion provides examples of devices or components for improving the aerodynamic efficiency (e.g., reduce drag) of vehicles, such as Class 8 tractors, trailers, combinations, etc. To improve the aerodynamic efficiency of a vehicle, the examples described herein provide one or more aerodynamic components or drag reducing devices positioned thereon. In some examples described herein, the one or more aerodynamic components are in the form of ground effects skirt sections attached to one or more underbody fairings (e.g., trailer side skirts, tractor side fairings, etc.) of a vehicle. In use, the ground effect skirt sections improve air flow underneath the vehicle, thereby reducing drag. As will be described in more detail below, the configuration of the ground effects skirt section in some embodiments improves vehicle aerodynamics in cross wind conditions. The devices or any combination of components hereinafter described may be installed on new vehicles or may be retrofitted on existing vehicles.

Although embodiments of the present disclosure will be described with reference to a Class 8 tractor-trailer combination, one skilled in the relevant art will appreciate that the disclosed embodiments are illustrative in nature and therefore should not be construed as limited to a Class 8 tractor and/or trailer. It should therefore be apparent that the disclosed systems and components thereof have wide application, and therefore may be suitable for use with many types of powered vehicles, such as passenger vehicles, buses, RVs, commercial vehicles, light and medium duty vehicles, and the like, as well as non-powered vehicles, such as cargo trailers, flatbed trailers, etc., and the like. Accordingly, the following descriptions and illustrations herein should not limit the scope of the claimed subject matter.

In the following description, numerous specific details are set forth in order to provide a thorough understanding of exemplary embodiments of the present disclosure. It will be apparent to one skilled in the art, however, that many embodiments of the present disclosure may be practiced without some or all of the specific details. In some instances, well-known process steps have not been described in detail in order not to unnecessarily obscure various aspects of the present disclosure. Further, it will be appreciated that embodiments of the present disclosure may employ any combination of features described herein.

FIG. 1 illustrates a left side view of a vehicle, such as a tractor-trailer combination 20, employing one or more examples of a known ground effects skirt section, generally denoted 90. The tractor-trailer combination 20 includes a lead vehicle 30 in the form of a heavy duty tractor and a trailing vehicle 70 in the form of a semi-trailer or trailer. The tractor 30 is articulatedly connected to a trailer 70 by a trailer coupling, such as, for example, a so-called fifth wheel, to form a tractor-trailer combination.

As shown in FIG. 1, the tractor 30 comprises a chassis (hidden in FIG. 1) supported by wheels 32 of a front wheel assembly and wheels 34 of a rear wheel assembly. The wheels 32 and 34 are connected to the chassis via drag-producing components, including conventional axles and suspension assemblies (not shown). In the embodiment shown in FIG. 1, the rear wheel assembly is of the dual-wheel, tandem-axle type.

A front section 36 of the vehicle 30 is supportably mounted on the chassis, as shown in FIG. 1. The front section 36 generally includes a hood 38 that generally covers a block-like shaped engine compartment housing an internal combustion engine that propels the tractor. In the embodiment shown, the hood is integrally formed with fenders 40, which define wheel wells 42 that house the wheels 30. The fenders 40 in this example may include integrally formed headlamp assemblies and side turn indicators (not shown).

The tractor 30 also includes a cab section 44 supportably mounted on the chassis rearwardly of the front section 36. The cab section 44 generally includes vertically oriented driver and passenger doors 46, a roof (hidden in FIG. 1 by a roof fairing 48, a windshield 50, and an optional sleeper section 52 that forms a compartment that houses driver and passenger seats, a dashboard with various gages, telematics, system controls, etc., a steering wheel for operating the tractor 30, and sleeping quarters if the optional sleeper section is included.

In the embodiment shown, the cab section 44 includes various aerodynamic devices, such as fairings, to improve the aerodynamics of the tractor. Examples of such fairings may include the roof fairing 48, which provides a smooth transition from the windshield 50 to the rear end of the cab section 44, as defined by a generally vertically oriented rear wall (hidden in FIG. 1). The tractor 30 may also include extender fairings 54 disposed at the trailing edges of the cab section 44.

The tractor 30 may also include one or more chassis fairings that aid in covering one or more structural aspects of the tractor, such as the gas tank, storage boxes, etc. The fairings provide improved air flow and aid in inhibiting air flow underneath the chassis. In the embodiment shown in FIG. 1, the one or more chassis fairings may include a front chassis fairing 56. The front chassis fairing 56 in some embodiments includes integrated steps for cab ingress/egress. Additional fairings, such as rear or quarter fender fairings, may be provided or integrally formed with the front chassis fairing 56. The one or more chassis fairings may also include a mid-chassis fairing(s) 58. The mid-chassis fairing(s) 58 in some embodiments is hingedly coupled to the chassis for providing access to the gas tanks, compressed air tanks, storage boxes, hoses, etc. The one or more chassis fairings may optionally include a rear chassis fairing 60. The rear chassis fairing in some embodiments can form a fender-like structure that covers the wheels 34 of the rear wheel assemblies and can extend from the mid-chassis fairing 58 to the end of or aft of the chassis.

Still referring to FIG. 1, the trailer 70 includes a trailer body that defines a cargo carrying interior cavity (not shown). In the embodiment shown, the trailer body is generally rectangular in shape, having generally planar, vertically oriented front and rear end panels 72 and 74; generally planar, vertically oriented side panels 76; a generally planar top panel 78; and a generally planar bottom panel, sometimes referred to as a cargo-supporting floor deck 80.

The undercarriage of the trailer 70 is also comprised of groupings of various drag-producing components, which generally reside below a cargo-supporting floor deck 80. The drag-producing components of a semi-type cargo trailer undercarriage customarily include rear axles and wheels of the rear wheel assembly 82, and other components, such as brake components, suspension components, and longitudinal and transverse structural support members, not shown for ease of illustration but well known in the art. The trailer 70 may include fairings, such as side skirt fairings 84, in order to provide improved air flow and aid in inhibiting air flow underneath the chassis.

FIG. 1 shows a known embodiment of a side skirt 84 positioned on the left side of the trailer 70. It should be noted that the structures and arrangements of the depicted left-hand side skirt 84 can be a mirror of the right-hand side skirt (not shown). Generally described, once mounted, the left-hand side skirt 84 traverse longitudinally below the lateral boundaries (i.e., left and right side) of trailer 70, as shown in FIG. 1. Each side skirt 84 can be mounted to any respective component of the tractor or trailer in order to be disposed adjacent to and to extend beneath the associated tractor/trailer fairing.

Figure 2:
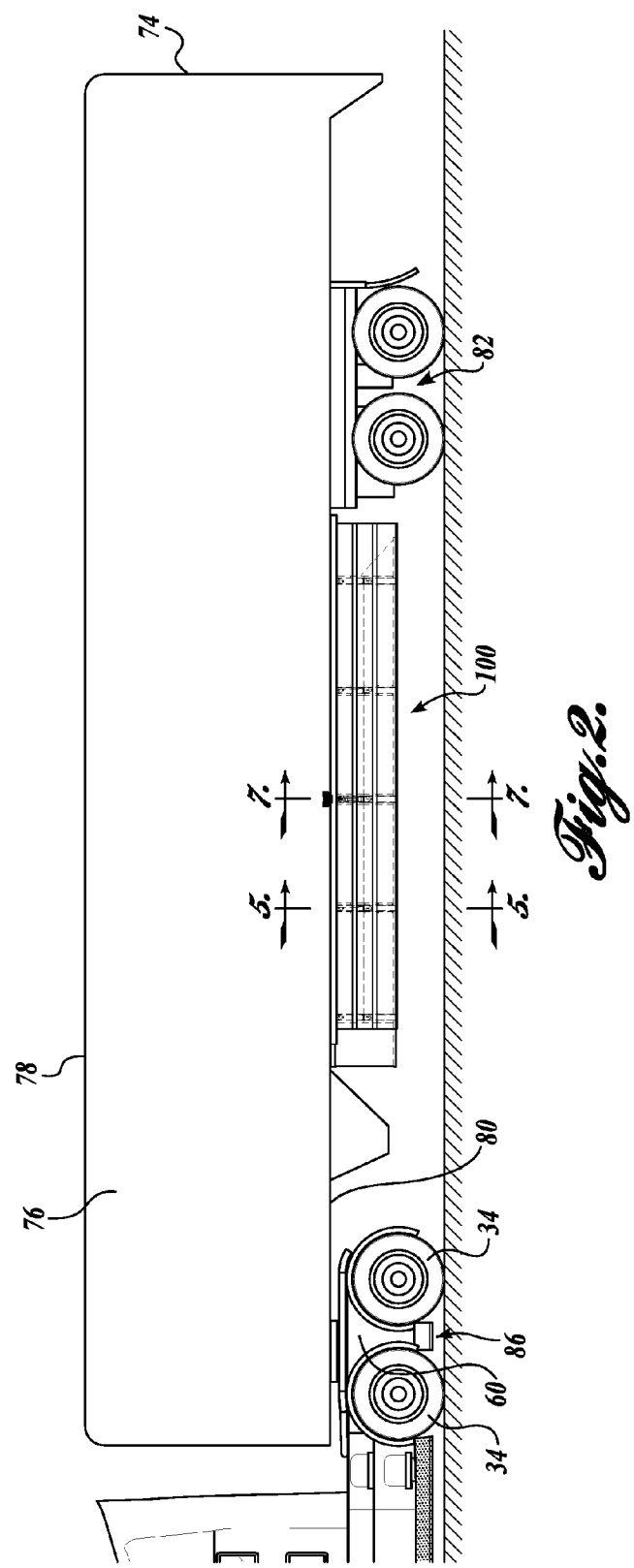
FIG. 2 shows a side view of a conventional cargo-type trailer having a trailer skirt according to aspects of a first representative embodiment of a disclosed trailer skirt, wherein the trailer skirt is in a deployed position.
Figure 3:
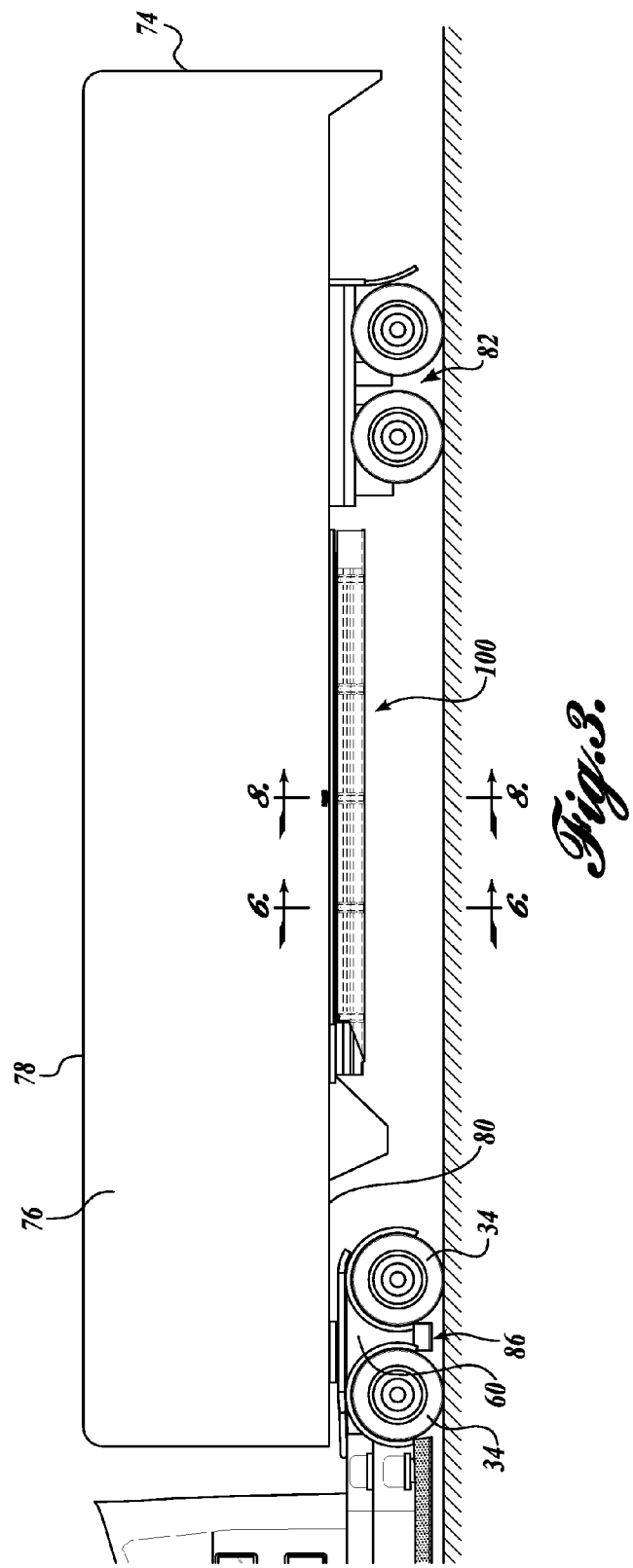
FIG. 3 shows the cargo-type trailer of FIG. 2 with the trailer skirt in a stowed position.

Referring now to FIGS. 2 and 3, a representative embodiment of the presently disclosed trailer skirt assembly 100 is shown in a deployed position and a stowed position, respectively. When the skirt assembly 100 is in the deployed position of FIG. 2, the skirt assembly 100 provides a generally vertical surface that extends down from a lower edge of the side panel 76 in the manner of a traditional side skirt. In one representative embodiment, a lower edge of the trailer skirt assembly 100 has a clearance of approximately 10 inches to the road surface. It will be appreciated, however, that the clearance of the skirt assembly 100 in the deployed position can vary and such alternate configurations should be considered within the scope of the present disclosure. The trailer skirt assembly 100 is typically in the deployed position when the tractor-trailer combination 20 is traveling on freeways to improve the aerodynamic efficiency of the trailer.

FIG. 3 shows the trailer skirt assembly 100 in a stowed position, in which the skirt assembly is folded up under the trailer 70. When in the stowed position, the representative embodiment of the trailer skirt assembly 100 has approximately 24 inches of clearance to the ground, although it will be appreciated that the clearance can vary within the scope of the present disclosure, and the disclosed embodiment should not be considered limiting. The additional clearance provided by the stowed position prevents impact with obstacles such as dock apron crowns, uneven parking lots, railroad crossings, etc.

Figure 4:
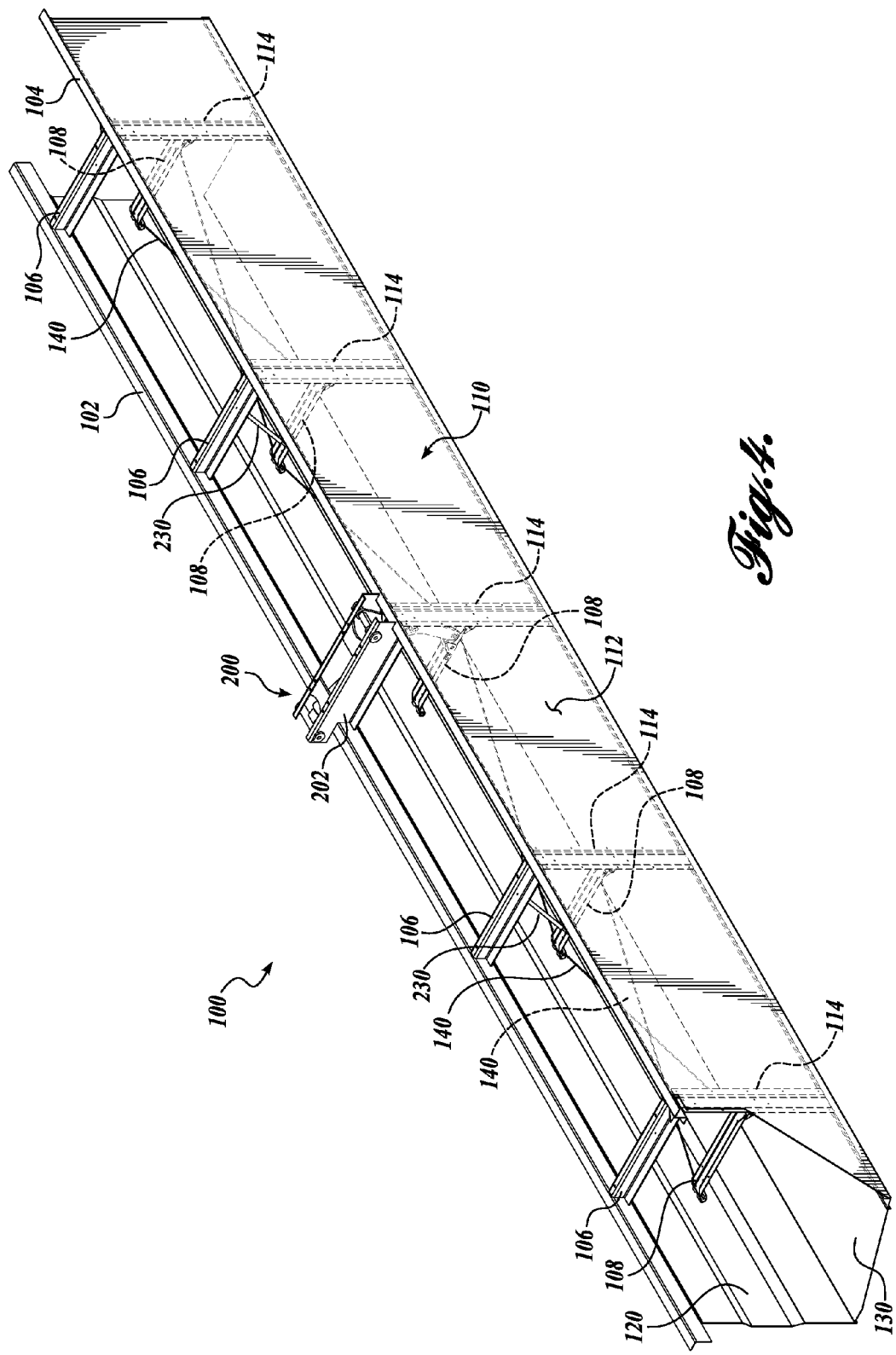
FIG. 4 shows an isometric view of the trailer skirt of FIG. 2.
Figure 5:
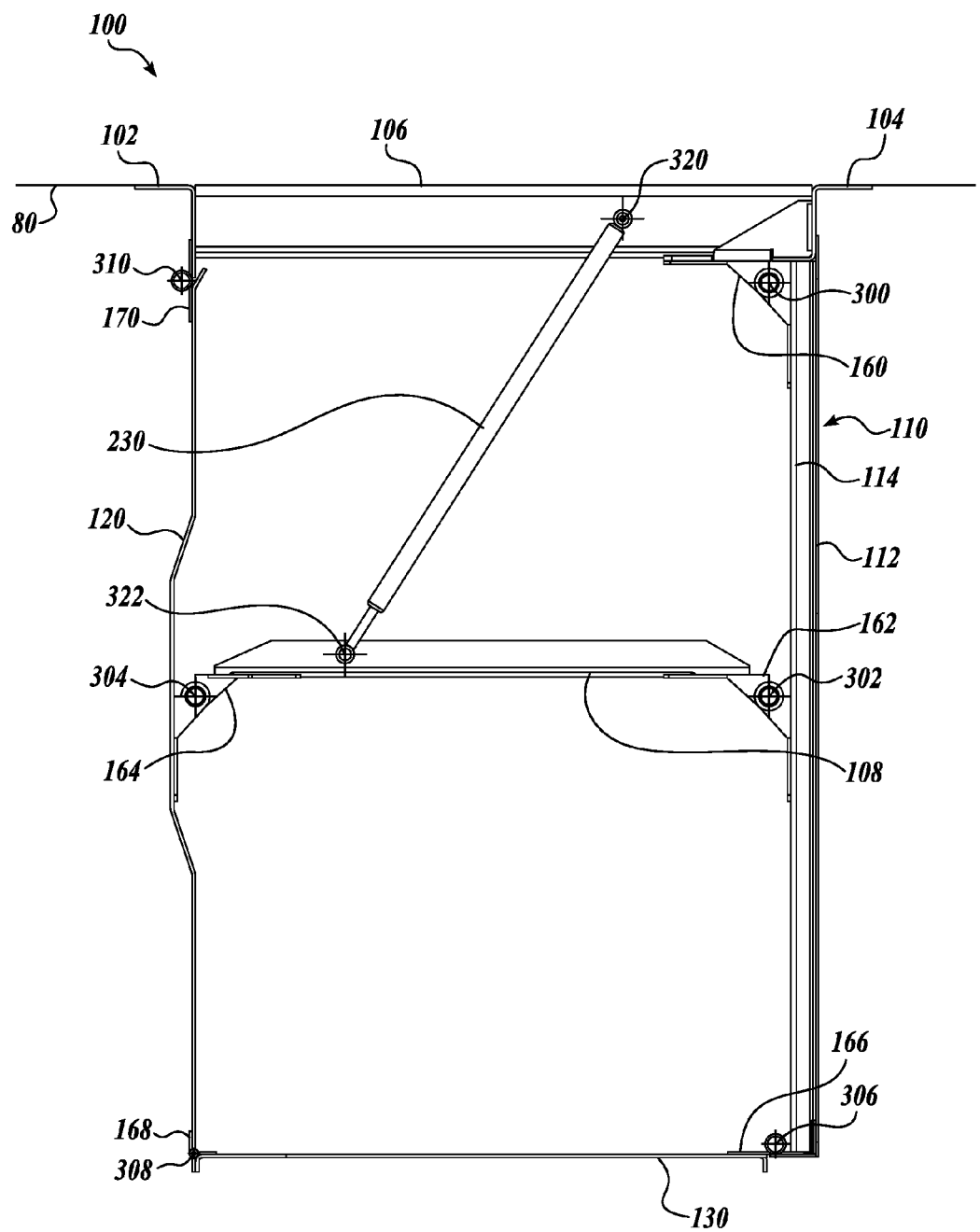
FIG. 5 shows a first cross-sectional view of the trailer skirt of FIG. 4, with the trailer skirt in the deployed position.
Figure 6:
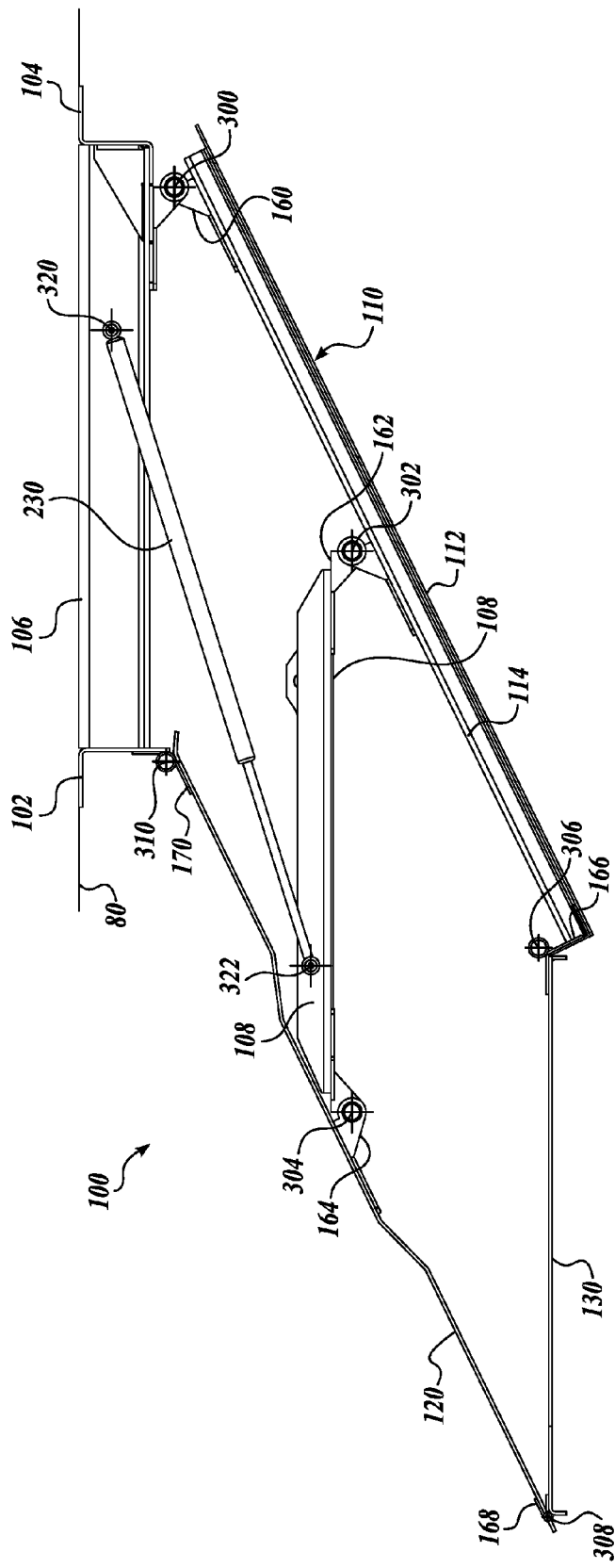
FIG. 6 shows the first cross-sectional view of the trailer skirt of FIG. 5, with the trailer skirt in the stowed position.

The skirt assembly 100 will now be described with reference to FIGS. 4-7. FIG. 4 shows an isometric view of the skirt assembly 100 in a deployed position. FIGS. 5 and 6 show section views of the skirt assembly of FIG. 3 with the skirt assembly 100 in the deployed position. FIGS. 6 and 8 show section views corresponding to FIGS. 5 and 7, respectively, with the skirt assembly 100 in the stowed position.

The skirt assembly 100 includes an inner rail 102 and an outer rail 14 that are generally parallel and extend longitudinally along the bottom of the trailer 70. Specifically, the outer rail 104 is mounted along an outer edge of the edge of the supporting floor deck 80, and the inner rail 102 is mounted to the supporting floor deck offset from and parallel to the outer rail. The inner rail 102 and outer rail 104 are mounted to the supporting floor deck 80 using any suitable configuration and provide structure to which other components of the skirt assembly are mounted. Alternate embodiments are contemplated wherein the inner and/or outer rails are integral to the trailer 70. Further, it will be appreciated that the inner and outer rails 102 and 104 can optionally be replaced or supplemented with additional support structure having varying sizes, shapes, configurations, locations, etc.

The skirt assembly 100 includes an outer panel assembly 110 rotatably coupled to the outer rail 104. The panel assembly 110 is rotatably coupled to the outer rail 104 about an axis 300 by a plurality of hinges 160 spaced along the outer rail 104. The panel assembly includes a substantially rectangular outer panel 112 with a plurality of vertically oriented panel supports 114 attached to an inner surface of the outer panel. The panel supports 114 are fastened to the outer panel 112 using known fasteners and provide both stiffness and mounting location for various components of the skirt assembly 100. When the outer panel assembly 110 is in the deployed position, an upper edge of the outer panel 112 engages an outer edge of the outer rail 104 and extends vertically downward so that the panel acts as an extension of the side panel 76 of the trailer 70.

The disclosed outer panel assembly 110 is representative only and should not be considered limiting. In this regard, the illustrated outer panel 112, and any other panels described herein, can have different shape or can instead be a comprised of a number of smaller panels. Further, the number, location, and configuration of the panel supports 114 can vary within the scope of the present disclosure. In addition, while a plurality of hinges 160 are described, the number, location, and type of hinges can vary within the scope of the present disclosure. In this regard, when disclosed elements of the described skirt assembly 110 are described as being rotatably mounted to, rotatably associated with, etc., it will be understood that the any known configuration can be utilized to accomplish the rotating association between the parts, including but not limited to discreet hinges, piano hinges, integral hinges, or any other suitable configuration or combination thereof. In addition, while the disclosed outer panel 112 is illustrated as being rotatably coupled to the outer rail 104, it will be appreciated that the outer panel need not be coupled directly to the outer rail, but can instead be coupled to structure proximate to the outer rail.

The skirt assembly 100 further includes an inner panel 140 extending downward from the inner rail 102. The inner panel 140 is rotatably coupled to the inner rail 102 about an axis 310 by a hinge 170. The axis 310 is parallel to the axis 300 about which the outer panel assembly 110 rotates. In the illustrated embodiment, the inner panel has the same approximate size and shape as the outer panel 112 so that the lower edge of the inner panel has approximately the same clearance to the road surface as the lower surface of the outer panel assembly 110.

Referring to FIGS. 4-6, a plurality of upper cross-members 106 extends laterally between the inner rail 102 and the outer rail 104. Each cross-member 106 is coupled at one end to the inner rail 102 and at the other end to the outer rail 104. The cross-members 106 are also preferably coupled to the floor deck 80 of the trailer 70. The cross-members 106 provide lateral support to the inner and outer rails 102 and 104, and also help to support the skirt assembly 100 by providing additional attachment points to the floor deck 80 of the trailer 70. In the illustrated embodiment, the location of the cross-members 106 corresponds to the locations of the panel supports 114, except at the drive assembly (described below). It will be appreciated that the number, location, and configuration of the cross-members can vary from the disclosed embodiment within the scope of the present embodiment.

Referring now to FIGS. 4-8, a plurality of mid-panel cross-members 108 extends laterally between the outer panel assembly 110 and the inner panel 120. In the illustrated embodiment, each cross-member 108 is rotatably coupled at one end about an axis 302 to a middle portion of a panel support 114 by a hinge 162. The opposite end of each cross-member 108 is rotatably coupled about axis 304 to the inner panel 120 by a hinge 164. Axes 300, 302, 304, and 310 are mutually parallel. As a result, the hinged attachment of the cross-members 108 to the outer panel assembly 110 and the inner panel 120 allows the outer panel assembly, cross-members 106 and 108, and inner panel to move as a 4-bar linkage. In this regard, the upper cross-members 106 maintain a fixed position relative to the floor deck 80 of the trailer 70, while the outer panel assembly 110, the inner panel 120, and the mid-panel cross-members 108 reciprocate between the deployed position of FIG. 5 and the stowed position of FIG. 7.

As best shown in FIG. 5, one edge of a closeout panel 130 is rotatably coupled about an axis 306 by a hinge 166. An opposite edge of the closeout panel 130 is rotatably coupled about an axis 308 by a hinge 168. Axes 306 and 308 are both parallel to axes 300, 302, 304, and 310. Accordingly, the outer panel assembly 110, the cross-members 106, the inner panel 120, and the closeout panel 130 move as a 4-bar linkage. The closeout panel 130 strengthens and stiffens the lower portions of the outer panel assembly 110 and inner panel 120, improves the aerodynamic efficiency of the skirt assembly 100 by directing airflow around the skirt assembly. The closeout panel 130 also protects the interior components of the skirt assembly 100 by preventing road debris from entering the space between the outer panel assembly 110 and the inner panel 120.

Referring back to FIG. 4, a plurality of tension cables 140 extend diagonally between opposite ends of adjacent mid-panel cross-members 108. That is, a tension cable 140 extends from an inner end of a first cross-member 108 to the outer end of an adjacent cross-member 108. The tension cables 140 provide additional longitudinal and lateral stability to both the outer panel assembly 110 and the inner panel 120. It will be appreciated that the number and configuration of the tension cables can vary within the scope of the present disclosure. Further, alternate bracing, such as tie rods, diagonal cross-members, or other structural elements can be utilized to provide additional stability to the various components of the skirt assembly 100, and such alternate configurations should be considered within the scope of the present disclosure.

As shown in FIGS. 4, 5, and 6, a plurality of springs 230 provide additional stability to the skirt assembly 100. In the illustrated embodiment, each spring 230 has a first end rotatably coupled to one of the upper cross-members 106 about an axis 320, and a second end rotatably coupled to the corresponding mid-panel cross-members 108 about an axis 322. The springs 230 are preferably damped air springs, but it will be appreciated that various types of damped and undamped springs can be utilized within the scope of the present disclosure. Moreover, the number and location of springs is not limited to the illustrated embodiment, but can include various alternate configurations wherein the number, location, and/or position of the springs 320 differs from the representative embodiment.

Figure 7:
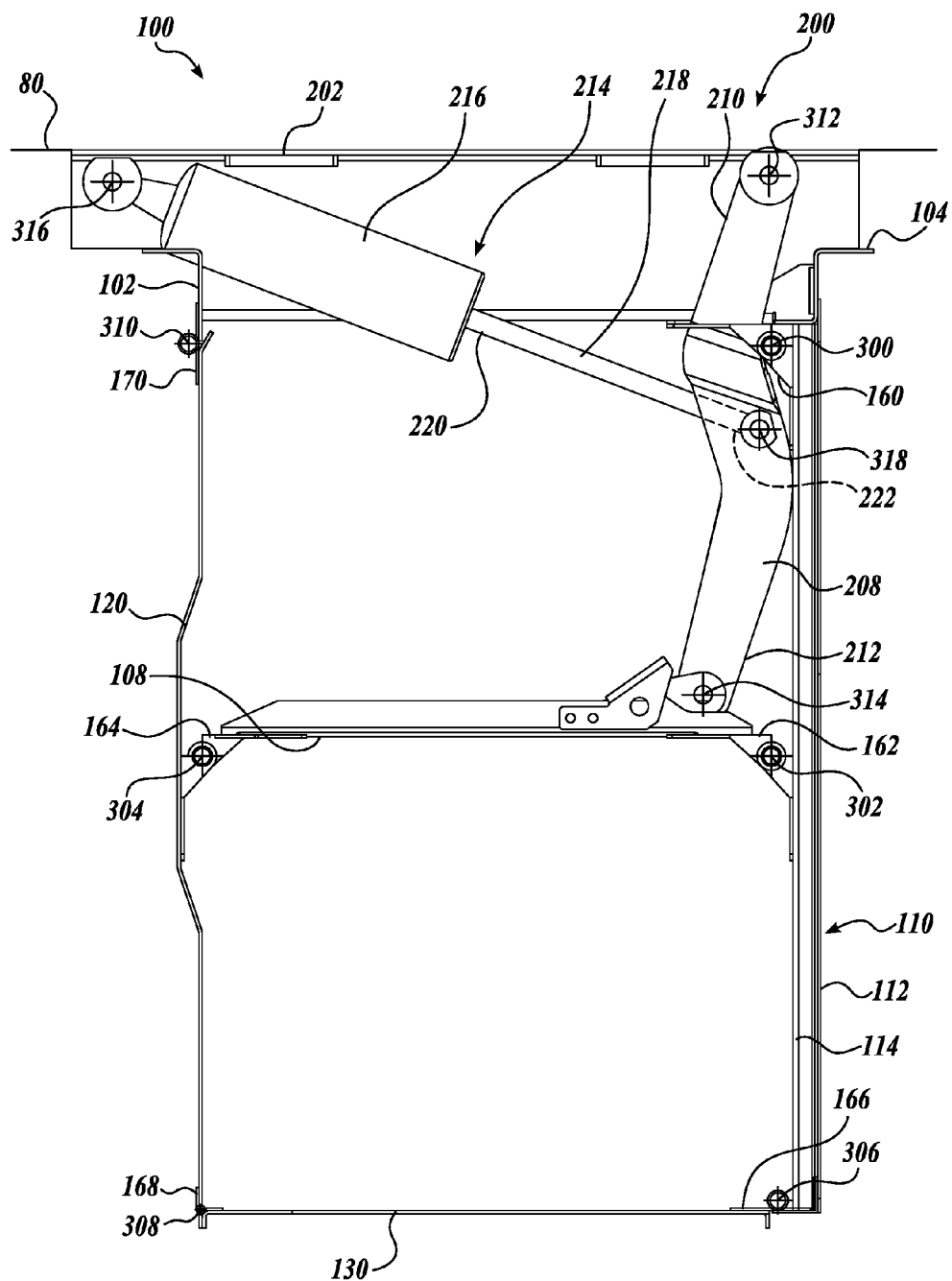
FIG. 7 shows a second cross-sectional view of the trailer skirt of FIG. 4, with the trailer skirt in the deployed position.

Referring now to FIGS. 4, 7, and 8, the drive assembly 200 will now be described. The drive assembly 200 includes a base 202 extending laterally between the inner rail 102 and the outer rail 104. In the illustrated embodiment, the base 202 takes the form of a channel that is coupled at a first end to the inner rail 102 and at a second end to the outer rail 104. In this regard, the base 202 is similar to the previously described cross-members 106.

A linear actuator 214 includes a cylinder 216 and a rod 218 at least partially received within the cylinder. The cylinder 216 is rotatably coupled about an axis 316 to the base 202 proximate to the inner rail 102. In the illustrated embodiment, the base 202 is configured so that the actuator 214 can rotate up to be received into a space between forward and rear walls of the base. A first end 220 of the rod 218 is slidably disposed within the cylinder 216, and a second end of the rod 218 is rotatable coupled about an axis 314 to a drive arm 208. It will be appreciated that the present disclosure is not limited to the illustrated linear actuator 214. In this regard, different types of actuators can be utilized in place of or in conjunction with the disclosed linear actuator. One non-limiting example of a suitable linear actuator is a rotary actuator. Further, it is contemplated that the number and location of the actuator or actuators can vary, and such variations should be considered within the scope of the present disclosure.

The drive arm 208 is an elongate element having a first end 210 rotatably coupled about an axis 312 to the base 202 proximate to the outer rail 104. The drive arm 208 extends downward, and a second end 212 of the drive arm 208 is rotatably coupled about and axis 314 to a corresponding mid-panel cross-members 108.

The rod 218 is selectively extendable from and retractable into the cylinder 216 to actuate the drive assembly 200 and, thereby move the skirt assembly 100 between the stowed and deployed positions. To move the skirt assembly 100 from the deployed position (FIG. 7) to the stowed position (FIG. 8), the rod 218, is retracted into the cylinder 216. The retraction of the rod 218 pulls on the drive arm 208 to rotate the drive arm about axis 312 in a clockwise direction as viewed in FIGS. 7 and 8. The movement of the drive arm 208 rotates the outer panel assembly 110 about axis 300 and the inner panel 120 about axis 310 until the skirt assembly 100 reaches the stowed position of FIG. 8.

To move the skirt assembly 100 from the stowed position (FIG. 8) to the deployed position (FIG. 7), the rod 218 is extended from the cylinder 218 to rotate the drive arm 208 about axis 312 in a counterclockwise direction as viewed in FIGS. 7 and 8. The rotation of the drive arm 208 rotates the outer panel assembly 110 about axis 300 and the inner panel 120 about axis 310 until the skirt assembly 100 reaches the deployed position of FIG. 7.

The actuator 214 is operatively connected to a controller (not shown), which is itself connected to an input device. The input device enables an operator to selectively control the actuator 214 to control the position of the skirt assembly 100. The input device can be a button, switch, dial, touchscreen device, or any other suitable device for receiving input from an operator and relaying the input to the controller. The input device is preferably located within the cab section 44 of the tractor to enable an operator to control the skirt assembly 100 when operating the tractor. It will be appreciated, however, that the location can vary to any other suitable location on the tractor or trailer within the scope of the present disclosure.

While illustrative embodiments have been illustrated and described, it will be appreciated that various changes can be made therein without departing from the spirit and scope of the disclosure.

The embodiments of the disclosure in which an exclusive property or privilege is claimed are defined as follows:

1. A stowable side fairing for a tractor-trailer having a frame, the side fairing being rotatable between a stowed position and a deployed position, the side fairing comprising:
    (a) a first panel, a first edge of the first panel being rotatably coupled to the frame, the first panel extending vertically downward from the frame when the side fairing is in the deployed position and rotating about the first edge when moving from the deployed position to the stowed position;
    (b) a second panel, a first edge of the second panel being rotatably coupled to the frame and extending downward from the frame;
    (c) a cross-member, a first end of the cross-member being rotatably coupled to a middle portion the first panel, a second end of the cross-member being rotatably coupled to a middle portion of the second panel;
    (d) a drive arm rotatably coupled at a first end to the frame and at a second end to the cross-member; and
    (e) an actuator configured to rotate the drive arm about the first end to rotate the side fairing between the deployed position and the stowed position.

2. The stowable side fairing of claim 1, further comprising a closeout panel rotatably coupled at a first edge to the first panel and rotatably coupled at a second edge to the second panel.

3. The stowable side fairing of claim 2, wherein the cross-member is disposed between the frame and the closeout panel.

4. The stowable side fairing of claim 1, wherein the actuator comprise a linear actuator.

5. The stowable side fairing of claim 4, wherein a first end of the linear actuator is rotatably coupled to the frame, and a second end of the linear actuator is rotatably coupled to the cross-member.

6. The stowable side fairing of claim 1, further comprising a spring, a first end of the spring being coupled to the frame, and a second end of the spring being coupled to the cross-member.

7. The stowable side fairing of claim 6, wherein the spring is a pneumatic spring.

8. The stowable side fairing of claim 6, wherein the spring is a compression spring.

9. The stowable side fairing of claim 6, wherein the spring is a damped spring.

10. A stowable side fairing for a tractor-trailer having a frame, the side fairing being rotatable between a stowed position and a deployed position, the side fairing comprising:
    (a) a first panel, a first edge of the first panel being rotatably coupled to the frame about a first axis and extending vertically downward from the frame when the side fairing is in the deployed position;
    (b) a second panel, a first edge of the second panel being rotatably coupled to the frame and extending downward from the frame;
    (c) a closeout panel, a first edge of the closeout panel being rotatably coupled to the first panel, a second edge of the closeout panel being rotatably coupled to the second panel, wherein the frame, the first panel, the second panel, and the closeout panel form a quadrilateral; and
    (d) an actuator configured to rotate the first panel about the first axis to rotate the side fairing between the stowed position and the deployed position.

11. The stowable side fairing of claim 10, wherein the quadrilateral is a rectangle when the side fairing is in the deployed position and a parallelogram when the side fairing is in the stowed position.

12. The stowable side fairing of claim 10, further comprising:
    (a) a cross-member rotatably coupled at a first end to the first panel and at a second end to the second panel; and
    (b) a drive arm rotatably coupled at a first end to the frame and at a second end to the cross-member.

13. The stowable side fairing of claim 12, wherein the actuator is configured to rotate the drive arm about the first end to move the side fairing between a deployed position and a stowed position.

\* \* \* \* \*